(12) United States Patent
Balagurunath

(10) Patent No.: US 11,900,826 B2
(45) Date of Patent: Feb. 13, 2024

(54) SENSORY STIMULI DEVICES FOR THE VISUALLY IMPAIRED

(71) Applicant: Ramapriya Balagurunath, Southborough, MA (US)

(72) Inventor: Ramapriya Balagurunath, Southborough, MA (US)

(*) Notice: Subject to any disclaimer, the term of this patent is extended or adjusted under 35 U.S.C. 154(b) by 284 days.

(21) Appl. No.: 17/508,100

(22) Filed: Oct. 22, 2021

(65) Prior Publication Data
US 2023/0128926 A1   Apr. 27, 2023

(51) Int. Cl.
| | | |
|---|---|---|
| *H04B 3/38* | (2006.01) | |
| *G09B 21/00* | (2006.01) | |
| *G06F 3/0354* | (2013.01) | |
| *G06F 3/03* | (2006.01) | |
| *G06F 3/01* | (2006.01) | |

(52) U.S. Cl.
CPC .......... *G09B 21/003* (2013.01); *G06F 3/016* (2013.01); *G06F 3/0321* (2013.01); *G06F 3/03542* (2013.01)

(58) Field of Classification Search
CPC ....... G09B 21/003; G09B 11/00; G06F 3/016; G06F 3/0321; G06F 3/03542; G06F 3/0308; G06F 3/0383; G06F 3/0386; G06F 3/03545
See application file for complete search history.

(56) References Cited

U.S. PATENT DOCUMENTS

| | | | |
|---|---|---|---|
| 4,507,087 A | 3/1985 | Stevenson | |
| 4,516,157 A | 5/1985 | Campbell | |
| 5,060,062 A | 10/1991 | Dotson | |
| 10,096,264 B2 * | 10/2018 | Robinson | ................ G06F 3/013 |

(Continued)

FOREIGN PATENT DOCUMENTS

| | | | | |
|---|---|---|---|---|
| EP | 2194447 A1 * | 6/2010 | ........... | G06F 3/0412 |
| KR | 10-2019-0011877 | 2/2019 | | |
| WO | WO 2012/114123 | 8/2012 | | |

OTHER PUBLICATIONS

Ackland et al., "World blindness and visual impairment: despite many successes, the problem is growing," Community Eye Health Journal, 2017, 30(100):71-73.

(Continued)

*Primary Examiner* — Toan N Pham
(74) *Attorney, Agent, or Firm* — Fish & Richardson P.C.

(57) ABSTRACT

A method for improving spatial awareness of a user during drawing includes obtaining, using one or more sensors, position information of a drawing instrument relative to a drawing canvas. The method includes determining, using one or more processors, a first vibration intensity when the drawing instrument is within a first region of the drawing canvas based on the obtained position information. The method includes determining, using the one or more processors, a second vibration intensity when the drawing instrument is within a second region of the drawing canvas based on the obtained position information. The second vibration intensity can be larger than the first vibration intensity and the second region can be distinct from the first region. The method includes generating, by a sensory device, a vibration based on one or both of the first vibration intensity or the second vibration intensity.

20 Claims, 9 Drawing Sheets

(56) References Cited

U.S. PATENT DOCUMENTS

2016/0267813 A1* 9/2016 Alsadah .................. G06F 3/014

OTHER PUBLICATIONS

Adebiyi et al., "Assessment of feedback modalities for wearable visual aids in blind mobility," Plos One, Feb. 9, 2017, 17 pages.

Afb.org [online], "Low Vision and Legal Blindness Terms and Descriptions," Sep. 4, 2019, retrieved on Aug. 30, 2021, retrieved from URL<https://www.afb.org/blindness-and-low-vision/eye-conditions/low-vision-and-legal-blindness-terms-and-descriptions>, 6 pages.

Amazon.com [Online], "10PCS 35mm Piezo Elements Buzzer Sounder Sensor Trigger Drum Disc," Jun. 4, 2021, retrieved on Oct. 22, 2021, retrieved from URL<https://www.amazon.com/Elements-buzzer-Sounder-Sensor-Trigger/dp/B073RK8KM3>, 5 pages.

Amazon.com [Online], "uxcell 28pcs Mixed Colour 3mm LEDs Prewired Light DC3-5V 20cm Pre Wired LED," Aug. 28, 2019, retrieved on Oct. 22, 2021, retrieved from URL<https://www.amazon.com/uxcell-28pcs-Colour-Prewired-DC3-5V/dp/B07X437GKD>, 7 pages.

Atowa et al., "Visual problems: a review of prevalence studies on visual impairment in school-age children," International Journal of Ophthalmology, 2019, 12(6):1037-1043.

Bhowmick et al., "An insight into assistive technology for the visually impaired and blind people: state-of-the-art and future trends," Journal on Multimodal User Interfaces, Jan. 7, 2017, 11:149-172.

Bolwerk et al., "How Art Changes Your Brain: Differential Effects of Visual Art Production and Cognitive Art Evaluation on Functional Brain Connectivity," Plos One, Jul. 2014, 9(7):e101035.

Create.arduino.com [Online], "Getting Started with the HC-SR04 Ultrasonic sensor," available on or before Oct. 27, 2020, retrieved on Oct. 22, 2021, retrieved from URL<https://create.arduino.cc/projecthub/Isaac100/getting-started-with-the-hc-sr04-ultrasonic-sensor-036380>, 28 pages.

Dakopoulos et al., "A 2D Vibration Array as an Assistive Device for Visually Impaired," Presented at 2007 IEEE 7th International Symposium on BioInformatics and BioEngineering, Boston, MA, USA, Oct. 14-17, 2007, pp. 930-937.

Dronebotworkshop.com [Online], "Using the HC-SR04 Ultrasonic Distance Sensor with Arduino," Aug. 2, 2017, retrieved on Oct. 22, 2021, retrieved from URL<https://dronebotworkshop.com/hc-sr04-ultrasonic-distance-sensor-arduino/>, 40 pages.

Focus [Online], "Focus' on Vision and Vision Loss," Jan. 1, 2016, retrieved on Oct. 21, 2021, retrieved from: URL<https://www.focusonvisionandvisionloss.org/>, 3 pages.

Heart.org [online], "What's blood type got to do with clot risk?," Jan. 23, 2020, retrieved on Aug. 27, 2021, retrieved from URL<https://www.heart.org/en/news/2020/01/23/whats-blood-type-got-to-do-with-clot-risk>, 3 pages.

Ibvi.org [online], "Blind vs. Visually Impaired: What's the Difference?," Sep. 12, 2020, retrieved on Aug. 30, 2021, retrieved from URL<https://ibvi.org/blog/blind-vs-visually-impaired-whats-the-difference/>, 2 pages.

insights.regencylighting.com [online], "What is CCT? A guide to choosing correlated color temperature for your lighting," Jan. 20, 2020, retrieved on Aug. 30, 2021, retrieved from: URL<https://insights.regencylighting.com/what-is-correlated-color-temperature-cct-and-how-do-you-choose-it-for-your-lighting>, 5 pages.

Jafri et al., "A Tangible Interface-based Application for Teaching Tactual Shape Perception and Spatial Awareness Sub-Concepts to Visually Impaired Children," Procedia Manufacturing, Jul. 2015, 3:5562-5569.

Mabvi.org [Online], "Massachusetts Association for the Blind and Visually Impaired—Living with Vision Loss," available on or before Jun. 27, 2015, retrieved on Oct. 21, 2021, retrieved from URL<https://www.mabvi.org/>, 2 pages.

Mass.gov [Online], "Massachusetts Commission for the Blind," Sep. 12, 2017, retrieved on Oct. 21, 2021, retrieved from URL<https://www.mass.gov/orgs/massachusetts-commission-for-the-blind>, 5 pages.

McDonald et al., "Tactile Aids for Visually Impaired Graphical Design Education," Proceedings of the 16th International ACM SIGACCESS Conference on Computers & Accessibility—ASSETS '14, Oct. 2014, pp. 275-276.

Muttray et al., "Blue-yellow dyschromatopsia in toluene-exposed workers," International Archives of Occupational and Environmental Health, Jan. 2019, 92(5):699-707.

mutualart.com [online], "How the Art World is Making Way for the Visually Impaired," Sep. 10, 2018, retrieved on Aug. 30, 2021, retrieved from URL<https://www.mutualart.com/Article/How-the-Art-World-is-Making-Way-for-the-/40BD2955157C32C1>, 4 pages.

Ncbi.nlm.nih.gov [online] "The impact of vision loss," Sep. 15, 2016, retrieved on Mar. 14, 2022, retrieved from URL <https://www.ncbi.nlm.nih.gov/books/NBK402367/?report=printable>, 13 pages.

Nih.gov [online], "Visual impairment, blindness cases in U.S. expected to double by 2050," May 19, 2016, retrieved on Aug. 30, 2021, retrieved from URL<https://www.nih.gov/news-events/news-releases/visual-impairment-blindness-cases-us-expected-double-2050>, 3 pages.

Pan et al., "Visual Impairment Among Older Adults in a Rural Community in Eastern China," Journal of Ophthalmology, Sep. 29, 2016, 6 pages.

Perkins [Online], "Perkins—School for the Blind," Dec. 22, 1996, retrieved on Oct. 21, 2021, retrieved from URL<https://www.perkins.org/>, 13 pages.

preventblindness.org [online], "Lighting for Low Vision," Jul. 6, 2013, updated Feb. 2, 2018, retrieved on Aug. 27, 2021, retrieved from URL<https://lowvision.preventblindness.org/2013/07/06/lighting-for-low-vision/>, 6 pages.

psychologytoday.com [online], "How Do Neuroplasticity and Neurogenesis Rewire Your Brain?," Feb. 6, 2017, retrieved on Aug. 27, 2021, retrieved from URL<https://www.psychologytoday.com/us/blog/the-athletes-way/201702/how-do-neuroplasticity-and-neurogenesis-rewire-your-brain>, 15 pages.

Sciencedaily.com [online], "Brain 'rewires' itself to enhance other senses in blind people," Mar. 22, 2017, retrieved on Aug. 27, 2021, retrieved from URL<https://www.sciencedaily.com/releases/2017/03/170322143236.htm>, 3 pages.

Scientificamerican.com [online], "Are one's fingerprints similar to those of his or her parents in any discernable way?," Jan. 24, 2005, retrieved on Aug. 27, 2021, retrieved from URL<https://www.scientificamerican.com/article/are-ones-fingerprints-sim/>, 5 pages.

Seeinginthedark.eu [online], "Senses in the dark," available on or before Dec. 29, 2020, via Internet Archive: Wayback Machine URL<http://web.archive.org/web/20201229181548/http://www.seeinginthedark.eu/senses-in-the-dark/sense-of-touch/>, retrieved on Sep. 1, 2021, retrieved from URL<http://www.seeinginthedark.eu/senses-in-the-dark/sense-of-touch/#:~:text=The%20sense%20of%20touch%20becomes,acuity%20is%20enhanced%20in%20blindness.&text=According%20to%20the%20tactile%20experience,touch%20drives%20tactile%20acuity%20enhancement>, 5 pages.

seenmagazine.us [online], "The Importance of Providing Quality Art Education for All Students," Nov. 27, 2011, retrieved on Aug. 30, 2021, retrieved from URL<https://www.seenmagazine.us/Articles/Article-Detail/ArticleId/1818/The-importance-of-providing-quality-art-education-for-all-students>, 12 pages.

Swenor et al., "Does visual impairment affect mobility over time? The Salisbury Eye Evaluation Study," Investigative Ophthalmology & Visual Science, Nov. 2013, 54:7683-7690.

Swenor et al., "Visual Impairment and Incident Mobility Limitations: the Health, Aging, and Body Composition Study," Journal of the American Geriatrics Society, Jan. 2015, 63(1):46-54.

Szubielska, "People with sight impairment in the world of visual arts: does it make any sense?" Disability & Society, Nov. 3, 2018, 33(9):1533-1538.

The Carroll Center [Online], "The Carroll Center for the Blind," Dec. 1, 1998, retrieved on Oct. 21, 2021, retrieved from URL<https://carroll.org/>, 5 pages.

(56) References Cited

OTHER PUBLICATIONS

Verhaelen et al., "Persistence of human norovirus in reconstituted pesticides—Pesticide application as a possible source of viruses in fresh produce chains," International Journal of Food Microbiology, Nov. 16, 2012, 160:323-328.

Who.int [online], "Blindness and vision impairment," available on or before Oct. 8, 2020, via Internet Archive: Wayback Machine URL<http://web.archive.org/web/20201008114203/https://www.who.int/news-room/fact-sheets/detail/blindness-and-visual-impairment>, retrieved on Aug. 30, 2021, retrieved from UR<https://www.who.int/news-room/fact-sheets/detail/blindness-and-visual-impairment>, 4 pages.

Who.int [online], "Blindness and vision impairment: Refractive errors," Oct. 6, 2013, retrieved on Oct. 21, 2021, retrieved from URL<https://www.who.int/news-room/q-a-detail/blindness-and-vision-impairment-refractive-errors>, 2 pages.

Who.int [online], "Visual Impairment and Blindness," Updated Aug. 2014, available on or before Aug. 7, 2014, via Internet Archive: Wayback Machine URL<http://web.archive.org/web/20140807201223/http://www.who.int/mediacentre/factsheets/fs282/en/>, retrieved on Aug. 27, 2021, retrieved from URL<http://www.who.int/mediacentre/factsheets/fs282/en/>, 4 pages.

* cited by examiner

SENSORY STIMULI DEVICES FOR THE VISUALLY IMPAIRED

BACKGROUND

This document relates to sensory stimuli devices for the visually impaired, e.g., during painting, drawing, and/or writing to improve spatial awareness.

Visual impairments affect millions of people worldwide, and studies have projected a vast increase in the number of visually impaired people due to a variety of environmental, age-related, and health factors. Some studies predict that there will be about 703 million people who will either be blind or possess a moderate to severe visual impairment by 2050. Other studies show that visual impairments can lead to severe loss in confidence, as well as other extreme emotional reactions. In some cases, this can be attributed to the fact that children and schools are less inclusive of visually impaired children due to lack of knowledge and availability of visual impairment equipment in traditional schools. Some studies have showed that 90% of visually impaired school-age children across multiple continents do not receive adequate education due to discrimination, stigmatization, and lack of access to proper educational means.

Visual impairments can be classified as a decrease in the ability to see to a certain degree. Visual impairments generally are not fixable by traditional means such as glasses or contacts. Visual impairment can be classified under four main categories: partial sight, low vision, legal blindness, and total blindness. Visual impairments vary in severity for all users but can fall under one of the three following categories: moderate, severe, or profound.

The term "vision impairment" includes blindness but partial sight and low vision are not classifications of blindness because these are two different types of conditions. For example, blindness refers to a complete loss of sight whereas low vision and partial sight classifications refer to a partial loss of sight.

The challenges that visual impairments pose for a user include, but are not limited to, the ability to read books; participate in a public classroom; perform various tasks, such as cooking and driving; and participate in recreational activities, including visual arts and sports. The challenges that visual impairments create are projected to affect an increasing number of people due to population growth in addition to aging.

One of the primary effects of visual impairment is in relation to mobility and motor skills. As sight makes up a significant part of stimuli and effective response to an environment, the lack of total sight impairs mobility, even with the help of assistive technologies. For example, the simple task of walking down stairs or navigating a sidewalk without an assistive aid or human guide can have dangerous consequences.

No matter how severe the impairment, the challenges posed by a visual impairment can affect daily life in several ways. One of the many challenges that people with vision impairments face is the ability to engage in the visual arts. The importance of visual arts touches all aspects of life due to the important skills that are developed at all ages. Art is one of many ways to persuade and educate people about thoughts, emotions, and events inspired by experience and history. Exposure to the arts develops creativity, which can further develop and positively impact academic performance, problem solving, and even leadership skills. The importance of visual arts in and out of schools can even act as a way to cope with mental illnesses such as anxiety and depression. Without the visual arts, an important outlet for personal dialogue and emotions will be lost.

SUMMARY

Described herein are sensory stimuli devices and methods for using sensory stimuli devices. For example, sensory stimuli devices for use during a visual arts activity (e.g., painting, drawing, writing, etc.) to improve spatial awareness are described. In particular, the sensory stimuli devices described herein generate a vibration to provide feedback to a user while performing a visual arts activity. The vibration is indicative of a position of the drawing instrument relative to the edges of the drawing canvas so the user knows when the drawing instrument is approaching the edges of the drawing canvas. This technology allows the user to feel more confident while performing visual arts activities because they know they are less likely to draw off (or miss) the drawing canvas. This technology also allows the user feel more confident while performing visual arts activities by reducing an appearance that the user has a visual impairment while simultaneously providing the feedback to the user.

In an aspect, a method for improving spatial awareness of a user during drawing includes obtaining, using one or more sensors, position information of a drawing instrument relative to a drawing canvas. The method includes determining, using one or more processors, a first vibration intensity when the drawing instrument is within a first region of the drawing canvas based on the obtained position information. The method includes determining, using the one or more processors, a second vibration intensity when the drawing instrument is within a second region of the drawing canvas based on the obtained position information. The second vibration intensity can be larger than the first vibration intensity and the second region can be distinct from the first region. The method includes generating, by a sensory device, a vibration based on one or both of the first vibration intensity or the second vibration intensity.

Implementations can include one or more of the following features.

In some implementations, the sensory device is external to the drawing instrument.

In some implementations, the first region includes a central region of the drawing canvas spaced away from one or more edges of the canvas by one or more threshold distances. In some cases, the second region includes a border region of the drawing canvas adjacent to the one or more edges of the canvas.

In some implementations, the method includes causing the vibration to change from the first vibration intensity to the second vibration intensity as the drawing instrument is used for drawing on the drawing canvas.

In some implementations, the method includes drawing on the drawing canvas using the drawing instrument.

In some implementations, the method includes illuminating a light attached to the drawing instrument with a constant color and a constant intensity.

In an aspect, a method for improving spatial awareness of a user during drawing includes obtaining, using one or more sensors, position information of a drawing instrument relative to a drawing canvas. The method includes determining, using one or more processors, a vibration intensity based on the obtained position information. The method includes generating a vibration of the drawing instrument using a motor attached to the drawing instrument based on the determined vibration intensity. The method includes illuminating a light attached to the drawing instrument with a constant color and a constant intensity.

Implementations can include one or more of the following features.

In some implementations, illuminating the light attached to the drawing instrument with the constant color and the constant intensity includes illuminating the light with a white-colored light.

In some implementations, determining the vibration intensity based on the obtained position information includes selecting one of at least two vibration intensities based on the obtained position information. In some cases, selecting the one of at least two vibration intensities is based on a distance of the drawing instrument from a center of the drawing canvas. In some cases, selecting the one of at least two vibration intensities is based on a distance of the drawing instrument from one or more edges of the drawing canvas based on the obtained position information.

In some implementations, the method includes obtaining one or more dimensions of the drawing canvas. In some cases, the method includes discretizing the drawing canvas into at least two distinct regions based on the one or more dimensions of the drawing canvas. In some cases, the discretization is further based on a distance of the drawing instrument away from a center and/or from one or more edges of the drawing canvas. In some cases, each region of the at least two distinct regions includes at least two planes of symmetry. In some cases, determining the vibration intensity based on the obtained position information includes determining the vibration intensity based on which region of the at least two distinct regions the drawing instrument is located in.

In some implementations, the one or more sensors include at least two ultrasonic imaging sensors.

In an aspect, a system for improving spatial awareness of a user during drawing includes one or more sensors arranged around a drawing canvas. The one or more sensors can be configured to obtain position information of a drawing instrument relative to the drawing canvas. The system includes one or more processors configured to determine an intensity of a vibration based on the obtained position information of the drawing instrument relative to the drawing canvas. The system includes a sensory device electrically connected to the one or more sensors and the one or more processors. The sensory device can be configured to removably attach to the drawing instrument. The sensory device can include a motor configured to generate the vibration when attached to the drawing instrument based on the determined intensity of the vibration.

Implementations can include one or more of the following features.

In some implementations, the system includes the drawing instrument. In some cases, the drawing instrument is a paintbrush, a pencil, a pen, a crayon, or a marker.

In some implementations, the sensory device is configured to removably attach to a proximal end of the drawing instrument.

In some implementations, the sensory device includes a light in electrical communication with the one or more processors. In some cases, the light is controlled by the one or more processors such that an intensity of the light is constant. In some cases, the intensity of the light is constant irrespective of the obtained position information. In some cases, the light is configured to illuminate at least a portion of the drawing canvas and the light is configured to be visible to a user using the drawing instrument.

In some implementations, the one or more sensors are mounted on an easel that accommodates the drawing canvas. In some cases, the one or more sensors are arranged such that a field of view of each of the one or more sensors is in a direction towards a center of the drawing canvas.

In some implementations, the system includes a body mount attachable to a user. In some cases, the body mount includes the one or more sensors. In some cases, the one or more sensors are arranged such that a field of view of each of the one or more sensors is in a direction towards a center of the drawing canvas.

Particular embodiments of the subject matter described herein can be implemented to realize one or more of the following advantages.

The sensory stimuli systems described herein use a vibration to provide feedback to the user. This vibration can be subtle and generally only noticeable by the user themselves. For example, as noted above, some users become self-conscious when using assistive technologies and do not want others nearby to take note of their visual impairment. The idea of being stared at or having their condition or assistive device being talked about would generally make an individual self-conscious or uncomfortable. The sensory stimuli systems described herein avoid these issues by using subtle vibrations only noticeable by the user.

The sensory stimuli systems described herein can use a constant color and intensity light irrespective of the position of the drawing instrument. A constant color and intensity light can reduce the appearance that the user is visually impaired since a varying light that depends on the position of the drawing instrument might alert others that the user has a visual impairment.

Similarly, the sensory stimuli systems described herein can exclude audible alerts for the same reason. Additionally, loud audible alerts can startle and/or alarm others, especially in quiet environments. The sensory stimuli systems described herein can avoid these issues by not using audible alerts.

The sensory stimuli systems described herein do not require a special canvas, a human guide, or the use of one's hands to feel around the drawing canvas to determine the edges of the drawing canvas. For example, in public schools, the need for equipment specific for those with visual impairments is not a major deciding factor in budgeting decisions. At home, students with a visual impairment may not have the means to create Braille paintings or be able to afford buying textured canvases. Effective tactile aids are also hard to implement at home or in a public school because most assistive technologies can be expensive and are generally only utilized by a small portion of the student body. In public schools, there are fewer cases of visual impaired students than those with motor disabilities, making visually impaired students disadvantaged at school. Furthermore, the sensory stimuli systems described herein are reusable. This is in contrast to textured canvases that cannot be reused once painted. This, in turn, reduces the financial burden of the sensory stimuli systems described herein.

Additionally, the sensory stimuli systems described herein do not require special materials and/or require a user to possess a required sensitivity for Braille art techniques. For example, Braille art paintings allow those without full sight to practice visual arts, but not all people with visual impairment can use this method because they may not have enough sensitivity in their fingers to sense the fine ridges of Braille characters. This is mainly attributed to the function of Merkel cells, which are receptors that correlate with finger sensitivity in people with and without visual impairment.

For example, a study performed on finger sensitivity found that users with a visual impairment, especially those who have had an impairment for a longer period of time (e.g., years, decades, etc.), develop a greater Merkel cell density at the fingertips, allowing them to better discern the ridges of Braille than their fully sighted counterparts. At the same time, Merkel cells themselves are not the only deciding factor of finger sensitivity; diabetic visually impaired people were found to have decreased finger sensitivity in the same study.

The sensory stimuli systems described herein use vibration to utilize an increased development of Merkel cells that some users develop due to their visual impairment. For example, some visually impaired users can have an increased awareness to vibration due to this increased development of Merkel cells, as noted above. However, an increased development of Merkel cells is not a requirement for the sensory stimuli systems described herein. This is in contrast to Braille art, which requires an increased development of Merkel cells, as noted above.

Furthermore, the use of vibration can allow different messages to be conveyed to the user. For example, a first vibration intensity can indicate that the user is painting within a first region (e.g., a central region) of the drawing canvas and a second vibration intensity can indicate that the user is painting within a second region (e.g., a border region) of the drawing canvas.

The sensory stimuli systems described herein can use a light with a correlated color temperature (CCT) range of about 3000K to 4800K to increase contrast while also being safe for the user's eyes. CCT refers to the gauge of the amount of blue or yellow light present in an artificial light source traditionally measured in Kelvin. When the range for the CCT is between 2000K and 3000K, it is at its warmest color temperature with mostly red, orange, and yellow light present. With CCTs over 4000K, the lighting is cooler, emitting light predominantly in the blue range. Using lighting that improves contrast while maintaining eye safety is important in not only solving the proposed issue but also preventing further damage to the eyes during use. As a result, the sensory stimuli systems described herein sometimes use a light with a light temperature that is close to being an even concentration of blue and yellow light temperatures.

The sensory stimuli systems described herein can aid many users who live with a poorer quality of life because of their lack of engagement in the visual arts. The sensory stimuli systems can reduce worsening mental health, help users develop critical creative thinking skills, reduce social deficits that affect confidence and increased isolation, and mitigate the stigma associated with visual impairment from interfering in the lives of many users worldwide.

The details of one or more implementations are set forth in the accompanying drawings and the description herein. Other features, objects, and advantages will be apparent from the description and drawings, and from the claims.

DESCRIPTION OF THE DRAWINGS

Like reference numbers represent corresponding parts throughout.

DETAILED DESCRIPTION

Figure 1:
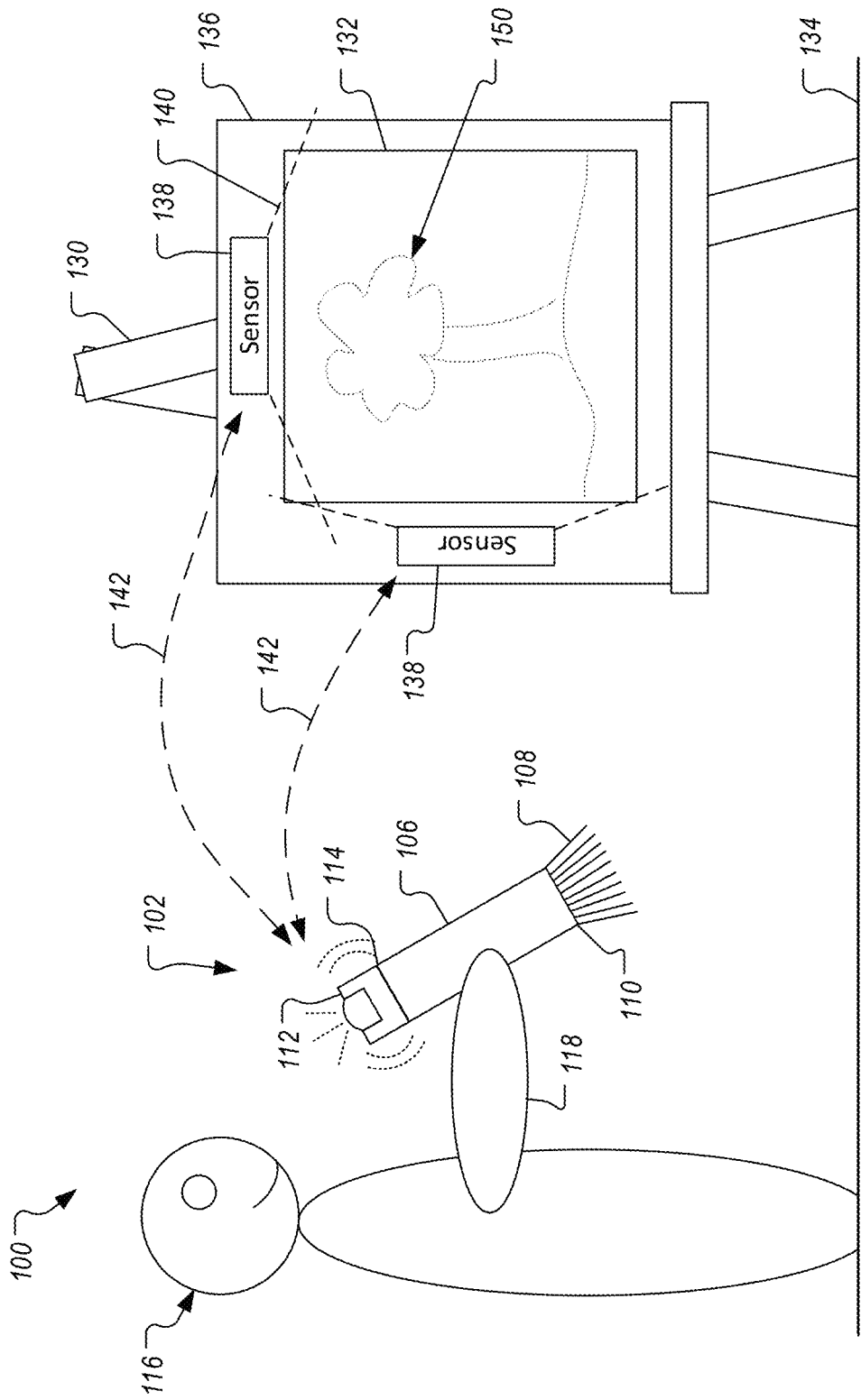
FIG. 1 shows an example drawing environment with a drawing instrument and one or more sensors.

This document describes sensory stimuli devices and methods for using sensory stimuli devices. For example, this document describes sensory stimuli devices for use during a visual arts activity (e.g., painting, drawing, writing, etc.) to improve spatial awareness. In particular, the sensory stimuli devices described herein generate a vibration to provide feedback to a user while performing a visual arts activity. The vibration is indicative of a position of the drawing instrument, for example, the position of the drawing instrument relative to the edges of the drawing canvas, so the user knows when the drawing instrument is approaching the edges of the drawing canvas. This technology allows the user to feel more confident while performing visual arts activities because they know they are less likely to draw off of (or miss) the drawing canvas. This technology also allows the user feel more confident while performing visual arts activities by reducing an appearance that the user has a visual impairment while simultaneously providing the feedback to the user.

FIG. 1 shows a drawing environment 100 that includes a user 116 holding a drawing instrument 102 who is drawing on a drawing canvas 132. The drawing canvas 132 can be any size canvas (e.g., a 8×10 inch canvas, a 9×12 inch canvas, an 11×14 inch canvas, a 18×24 inch canvas, a 24×30 inch canvas, etc.).

In the example shown, the drawing instrument 102 is a paintbrush with bristles 108 and the user 116 is painting a tree 150 on the drawing canvas 132 using the drawing instrument 102. In some implementations, the user 116 holds the drawing instrument 102 in one hand 118 while the other hand (not shown) is free to hold other objects.

As used herein, the term "drawing" is used to represent any visual arts activity such as drawing, writing, coloring, painting, etc. The examples described herein typically refer to painting activities, but the systems and methods described herein can be applied to other forms of visual arts activity as well. For example, the drawing instrument 102 in this example includes a paintbrush, but in some examples, the drawing instrument can be a pencil, a pen, a marker, a Crayon® chalk, etc. In this way, the systems and methods described herein can be used with a plurality of drawing instruments for various applications that include drawing, writing, coloring, etc.

Additionally, the examples described herein primarily focus on 2D drawing applications, but the systems and methods described herein can also be used with 3D drawing applications (e.g., sculpturing visual arts activities) as well.

The drawing instrument 102 includes a sensory device 112 that is attachable to a proximal end 114 of the drawing instrument 102. In this example, the drawing instrument 102 includes a cylindrical body 106 with a plurality of bristles 108 emanating from a distal end 110 of the cylindrical body 106. While the drawing instrument 102 includes a body 106 that is cylindrical, some drawing instruments have other shapes with various different types of cross-section (e.g., square, hexagon, octagon, etc.). As noted above, the drawing instrument 102 in this example includes a paintbrush. For example, the cylindrical body 106 and the plurality of bristles 108 define a paintbrush.

Figure 2A:
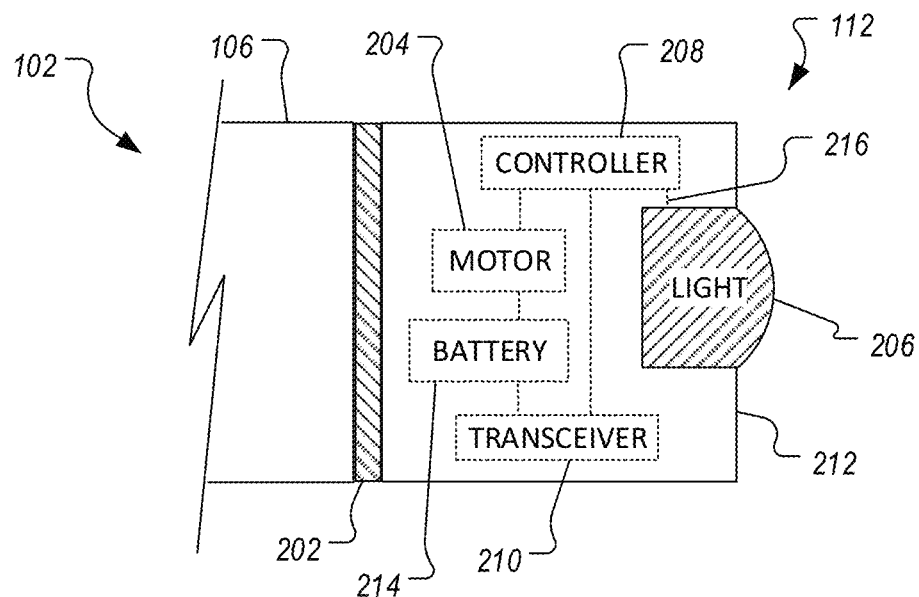
FIGS. 2A and 2B show the drawing instrument of FIG. 1.

Referring to FIG. 2A, the sensory device 112 is attached to the drawing instrument 102 using a removable connection 202. In some examples, the removable connection 202 is a Velcro® attachment. In some examples, the removable connection 202 spans an entire distal face of the sensory device 112.

The removable connection 202 enables the sensory device 112 to be attached to various drawing instruments as needed. For example, the user 116 can detach the sensory device 112 from the drawing instrument 102 and attach the sensory device 112 to a different drawing instrument (e.g., a pencil) for a writing application. In some examples, the user 116 can detach the sensory device 112 from the drawing instrument 102 and attach the sensory device 112 to a marker for a coloring application.

While the sensory device 112 is shown attached to a proximal end of the cylindrical body 106, in some examples, the sensory device 112 is attached to a side of the cylindrical body 106 (e.g., via one or more straps (e.g., Velcro® straps)) that wrap around the circumference of the cylindrical body 106. In this way, the sensory device 112 can be attached to the drawing instrument 102 at one or more attachment locations.

As described above, a purpose of the sensory device 112 is to provide feedback to the user 116 during visual arts activities (e.g., drawing, writing, painting, coloring, etc.). In some examples, the feedback is a visual feedback in the form of light. In some examples, the feedback is a vibratory feedback in the form of vibration. In some examples, the feedback is a combination of visual feedback and vibratory feedback.

As shown in FIG. 2A, the sensory device 112 includes a motor 204, a light 206, a controller 208, a battery 214, and a transceiver 210. In some examples, the controller 208 includes one or more processors. In some examples, the motor 204, the light 206, the controller 208, the battery 214, and the transceiver 210 are electrically connected to each other via wires 216 (or electric circuitry).

In some examples, the motor 204 spins an imbalanced mass to generate a vibration of the sensory device 112. Because the sensory device 112 is attached to the cylindrical body 106 via the removable connection 202, the motor 204 causes the entire drawing instrument 102 to vibrate. In particular, the controller 208 transmits a signal to the motor 204 to rotate the imbalanced mass to generate the vibration. In some examples, the controller 208 causes the battery 214 to transmit a 3.3 Volt DC signal to the motor 204 (e.g., via a solenoid) to cause the motor 204 to spin and generate the vibration. In some cases, the controller 208 varies a voltage of motor 204 to generate various vibration intensities (e.g., a 1 Volt signal generates a relatively low intensity vibration, a 2 Volt signal generates a relatively medium vibration intensity, a 3 Volt signal generates a relatively high vibration intensity, etc.). In some examples, the battery 214 is a rechargeable battery. In some examples, more than one motor 204 is used to generate the vibration. In some examples, the vibration is a continuous vibration. In other examples, the vibration is an intermittent vibration (e.g., pulsed).

In some examples, the light 206 is a 4-pin RGB LED that is powered by 5 Volts. For example, the controller 208 causes the battery 214 to transmit a 5 Volt DC signal to the light 206 (e.g., via a solenoid) to cause the light 206 to illuminate. In some examples, the controller 208 transmits a signal to cause the light 206 to illuminate with a 100% duty cycle representing the full rated brightness of the light 206. In some examples, more than one light 206 is used. In some examples, the light 206 is a multi-color LED that produces white light, green light, blue light, yellow light, and red light. In some examples, the light 206 has a color temperature (CCT) range of about 3000K to 4800K to increase the contrast of the light 206 while also being safe for the user's 116 eyes. In some cases, the light 206 uses a light temperature that is an even (or, e.g., close to even) concentration of blue and yellow light temperatures (e.g., the amount of blue light is within 10% of the amount of yellow light).

Figure 2B:
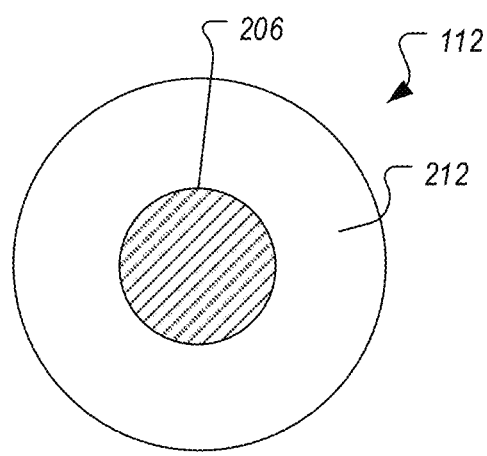

As shown in FIGS. 2A & 2B, the light 206 can protrude out of the proximal end 212 of the sensory device 112. In some examples, a protruding light 206 can be more visible to the user 116 than a non-protruding light. The light 206 can be located at the axial center of the proximal end 212.

Referring back to FIG. 1, the sensory device 112 (and more specifically, the transceiver 210) receives signals 142 from one or more sensors 138. In the example shown, the one or more sensors 138 include two sensors 138 but more than two sensors can also be used (e.g., three, four, etc.). In some examples, one sensor 138 is located to the side of the drawing canvas 132 (e.g., to the left-hand side relative to a perspective of the user 116) and the other sensor 138 is located above the drawing canvas 132 (e.g., "above" being relative to the perspective of the user 116).

Figure 3:
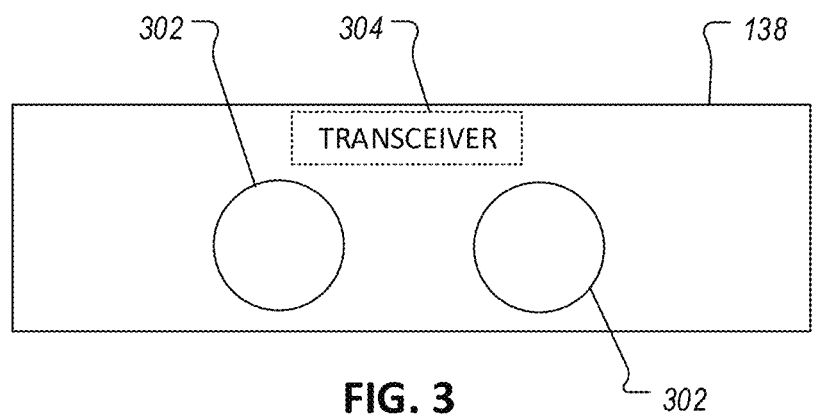
FIG. 3 shows the one or more sensors of FIG. 1.

Referring to FIG. 3, each sensor 138 can include two ultrasonic imaging sensors 302 and a transceiver 304 for communicating with the sensory device 112. In some examples, the transceiver 304 is a wireless transceiver that communicates with the sensory device 112 via NFC, Bluetooth, Wi-Fi, and/or the like. In this way, the sensory device 112 is electrically connected to the one or more sensors 138.

As shown in FIG. 1, the one or more sensors 138 are mounted on an easel 130 that accommodates the drawing canvas 132. The easel 130 stands upright from a ground 134 surface (e.g., a floor) and holds a drawing canvas 132 at a height comfortable for the user 116 to use the drawing instrument 102 for drawing on the drawing canvas 132. In some examples, the easel 130 positions the drawing canvas 132 so that a center the drawing canvas 132 is 2 to 4 feet above the ground surface 134. The easel 130 includes a frame 136 that supports the drawing canvas 132 and provides a mounting structure for one or more sensors 138.

The sensors 138 are positioned such that their fields of view 140 at least partially overlap. The fields of view 140 span a majority of the surface area of the drawing canvas 132. In some examples, the sensors 138 are positioned such that their fields of view 140 span 90-100% of the surface area of the drawing canvas 132. In this way, the one or more sensors 138 can be arranged such that a field of view 140 of each of the one or more sensors 138 is in a direction towards a center of the drawing canvas 132.

Figure 4:
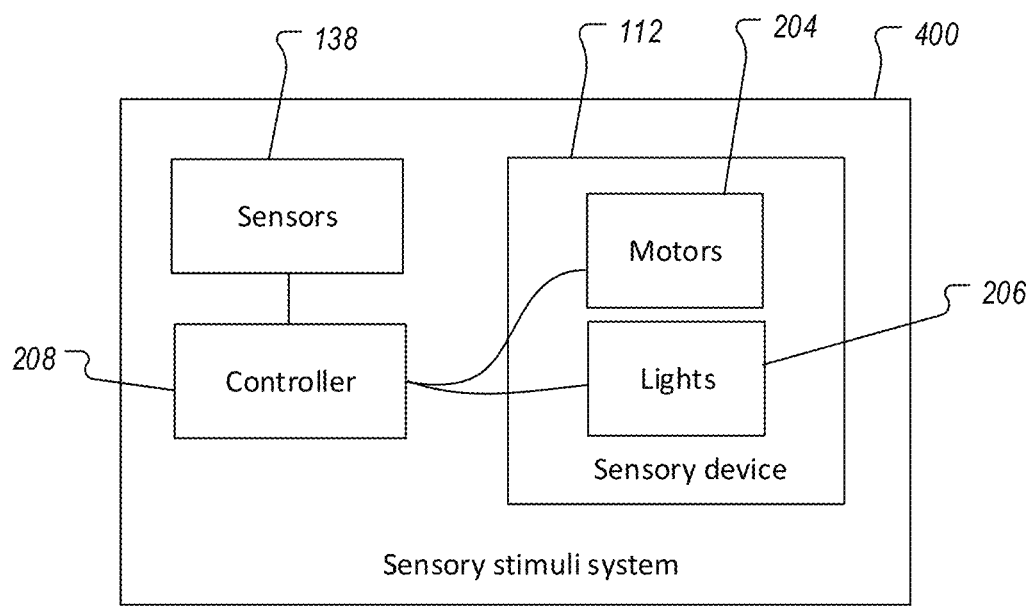
FIG. 4 is a schematic of a sensory stimuli system.

FIG. 4 is a schematic of a sensory stimuli system 400. Generally, the sensory stimuli system 400 includes at least the sensory device 112, the controller 208, and the one or more sensors 138. In some examples, the controller 208 is located in the sensory device 112. In some examples, the controller 208 can be located in the sensors 138 or located remotely (e.g., in the cloud, a nearby computer, a nearby smartphone, etc.) For example, a processor of the user's 116 smartphone can be used to perform the actions of the controller 208. In some examples, the smartphone receives signals from the sensors 138, determines a vibration intensity and/or light intensity (as described below), and transmits signals to the sensory device 112 for causing the sensory device 112 to generate the vibration and/or illumination.

In some examples, the sensory stimuli system 400 includes the drawing instrument 102. As noted above, the drawing instrument 102 can include a paintbrush, a pencil, a pen, a crayon, a marker, etc. In this way, the sensory stimuli system 400 can be packaged into a kit that includes the sensory device 112, the one or more sensors 138, and the drawing instrument 102.

Figure 5:
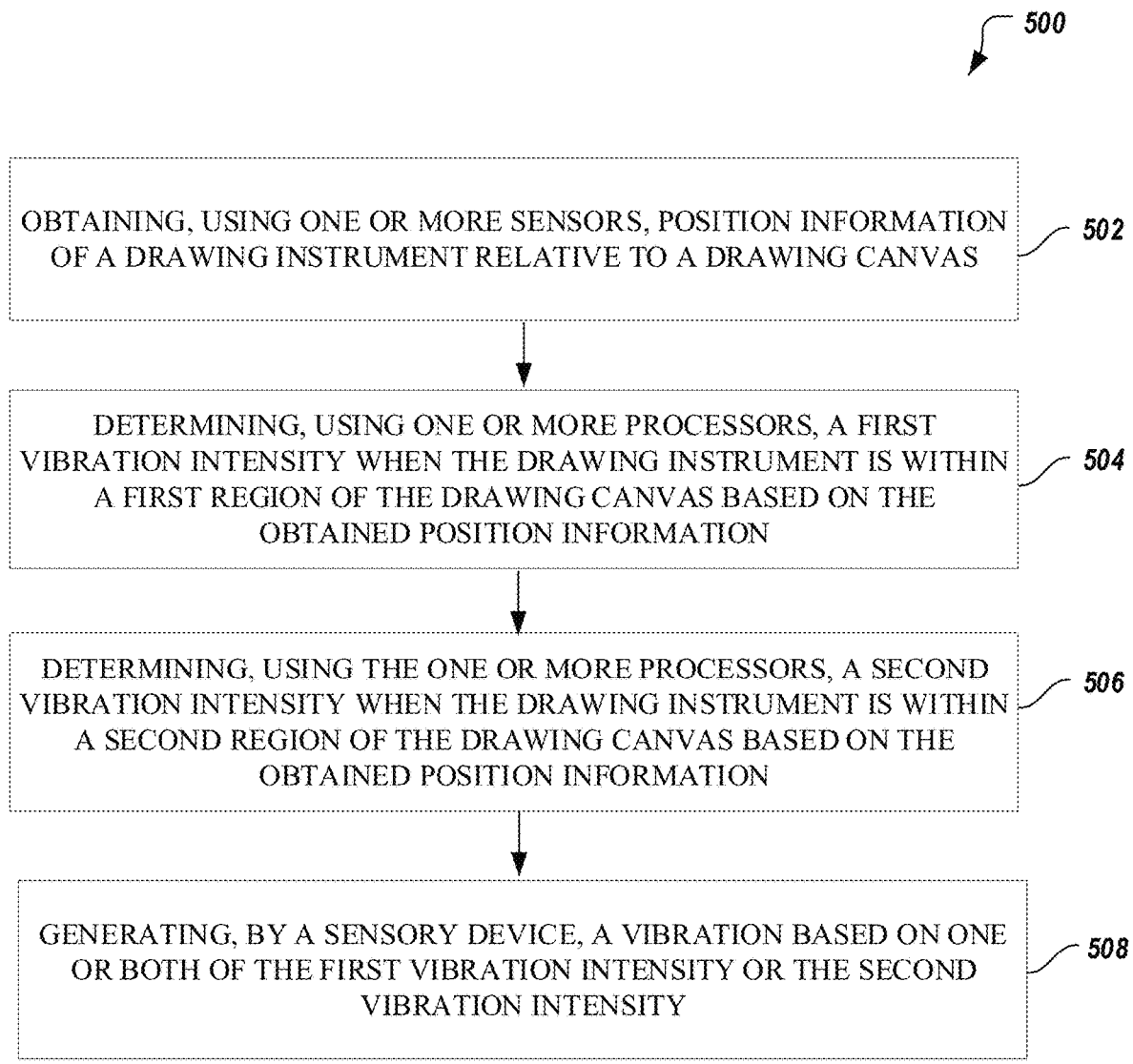
FIG. 5 is a flowchart of an example process performed by the sensory stimuli system.

FIG. 5 is a flowchart of an example method 500 of the sensory stimuli system 400. In general, the method 500 improves a spatial awareness of a user (e.g., user 116) during drawing (or other visual arts activities). In some examples, the user 116 draws on the drawing canvas 132 with the drawing instrument 102 at the same time that the controller 208 performs the method 500 as described below.

At step 502, the method 500 includes obtaining, using one or more sensors, position information of a drawing instrument relative to a drawing canvas. For example, the one or more sensors 138 can obtain position information of the drawing instrument 102 using their respective fields of view 140. In this way, when the drawing instrument 102 is placed in an upper-left quadrant of the drawing canvas 132 (e.g., by the user 116 while drawing), the one or more sensors 138 obtain position information that the drawing instrument 102 is located in the upper-left quadrant of the drawing canvas 132 based on their respective fields of view 140 of the sensors 138. Details regarding determining when the drawing instrument is within specific regions of the drawing canvas is described with reference to FIG. 6 below.

In some implementations, the method 500 includes obtaining one or more dimensions of the drawing canvas. In some examples, the user 116 selects the canvas size from a list of canvas sizes on a user interface (not shown) of the sensory device 112. In turn, the controller 208 determines a threshold distance based on the selected canvas size. In some examples, the threshold distance defines a region on the drawing canvas inward from each edge of the drawing canvas. In some examples, the region is defined by measuring from each edge of the drawing canvas to an inward location on the drawing canvas. In some examples, the region is defined by perpendicularly measuring from each edge to an inward location a distance that equals the threshold distance. In some examples, the region represents a border region around the perimeter of the drawing canvas. In some examples, the threshold distance can be used to define a border region of the drawing canvas that is adjacent to each of the edges. In this way, a relatively larger threshold distance can correspond to a relatively larger boarder region, and vice versa. Further details regarding these regions are described with reference to FIG. 6 below.

In some implementations, as the user moves the drawing instrument 102 from a center region of the drawing canvas into a border region defined by the threshold distance, the method alerts the user that he or she is approaching the edges of the drawing canvas. The alert can be perceived by the user as a warning to return to the center of the drawing canvas.

In some implementations, the controller 208 determines the threshold distance to be 8 inches when the selected canvas size is a 24×30 canvas. In other examples, the method determines one or more dimensions of the drawing canvas 132 based on the position information from the sensors 138.

In some implementations, the method 500 includes discretizing the drawing canvas 132 into at least two distinct regions based on the one or more dimensions of the drawing canvas 132. For example, the controller 208 can discretize the drawing canvas 132 into three regions when the canvas size is larger than a particular canvas threshold (e.g., 24×30). Likewise, the controller 208 can discretize the drawing canvas 132 into two regions when the canvas size is less than the canvas threshold. In some cases, each region of the at least two distinct regions includes at least two planes of symmetry. In some cases, determining the vibration intensity based on the obtained position information includes determining the vibration intensity based on which region of the at least two distinct regions the drawing instrument is located in.

Figure 6:
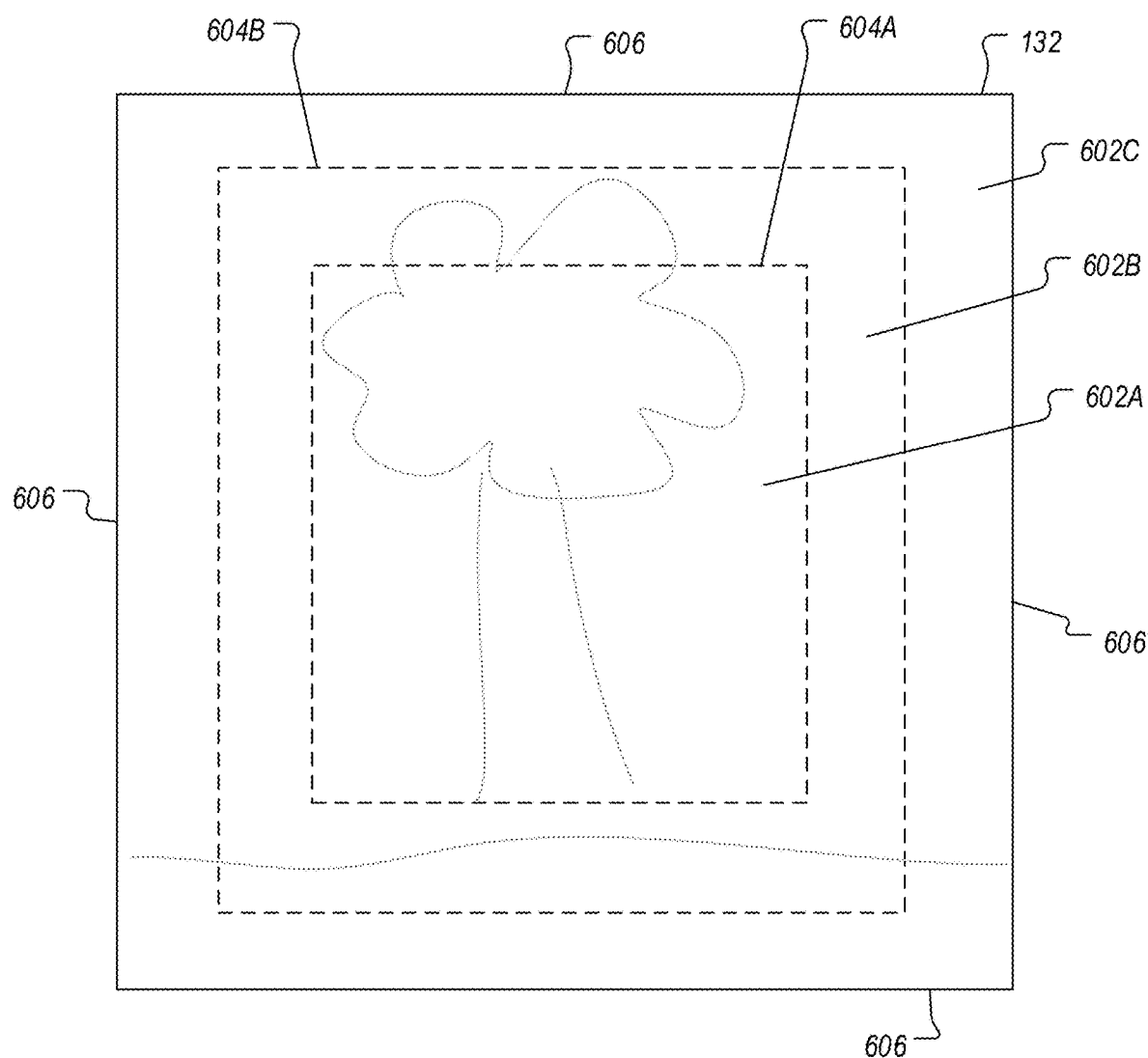
FIG. 6 shows three distinct regions of a drawing canvas of FIG. 1.

FIG. 6 shows three distinct regions 602A-602C of the drawing canvas 132. A space internal to the first boundary 604A defines a first region 602A. The space between the first boundary 604A and the second boundary 604B defines the second region 602B. Likewise, the space between each edge 606 of the drawing canvas 132 and the second boundary 604B defines the third region 602C.

In some examples, the first boundary 604A is a threshold distance away from each edge 606 of the drawing canvas 132 (e.g., 1 inch, 2 inches, 3 inches, etc.). In some examples, the threshold distance depends on the specific canvas size used. For example, the distance can be greater for larger canvases than for smaller canvases. Likewise, in some examples, the second boundary 604B is a predetermined distance away from each edge 606 of the drawing canvas 132 and is less than the distance of the first boundary 604A. For example, the controller 208 determines the predetermined distance to be 4 inches when the selected canvas size is a 24×30 canvas.

At step 504, the method 500 includes determining, using one or more processors, a first vibration intensity when the drawing instrument is within a first region of the drawing canvas based on the obtained position information. For example, the controller 208 can determine to use a first vibration intensity when the drawing instrument 102 is within the first region 602A. In some examples, the first region 602A represents a "central" region 602A of the drawing canvas 132 that is spaced away from one or more edges 606 of the drawing canvas 132 by one or more threshold distances (as described above). In some examples, this lack of vibration within the first region 602A indicates to the user 116 that the edges 606 of the drawing canvas 132 are far away from the drawing instrument 102 that the drawing instrument 102 is unlikely to touch or pass the edges 606 of the drawing canvas 132. In this way, the controller 208 selects one of at least two vibration intensities (e.g., off vs. on) based on the obtained position information and specifically based on a distance of the drawing instrument 102 from one or more edges of the drawing canvas 132.

In some examples, the controller 208 determines that the drawing instrument 102 is within the first region 602A based on the obtained position information by comparing the current 2D coordinates of the drawing instrument 102 from both of the sensors 138 against the boundary of the first region 602A. If the current 2D coordinates represent a position within the space spanned by the boundary of the first region 602A, then the controller 208 determines that the drawing instrument 102 is within the first region 602A.

At step 506, the method 500 includes determining, using the one or more processors, a second vibration intensity when the drawing instrument is within a second region of the drawing canvas based on the obtained position information. For example, the controller 208 can determine to use a second vibration intensity when the drawing instrument 102 is within the second region 602B. In some examples, the second vibration intensity is greater than zero to indicate to the user 116 that the drawing instrument 102 has moved out of the central region 602A. In some examples, this vibration indicates to the user 116 that the edges 606 of the drawing canvas 132 are near the drawing instrument 102 and that the drawing instrument 102 is more likely to touch or pass the edges 606 of the drawing canvas 132 than when the drawing instrument 102 was in the first region 602A. As noted in this example, the second vibration intensity can be larger than the first vibration intensity and the second region can be distinct from the first region.

In some examples, the method 500 determines a third vibration intensity when the drawing instrument is within a third region of the drawing canvas based on the obtained position information. For example, the controller 208 can determine to use a third vibration intensity when the drawing instrument 102 is within the third region 602C. In some examples, the third vibration intensity is larger than the second vibration intensity to indicate to the user 116 that the drawing instrument 102 has moved out of the central region 602A and the second region 602B. In some examples, this vibration indicates to the user 116 that the edges 606 of the drawing canvas 132 are close to the drawing instrument 102 and that the drawing instrument 102 is likely to touch or pass the edges 606 of the drawing canvas 132.

In some examples, when the user 116 senses the vibration of the sensory device 112 (e.g., via the user's hand 118), the vibration gives an indication of the positioning of the drawing instrument 102 relative to the edges 606 of the drawing canvas 132. For example, moving the drawing instrument 102 from the first region 602A to the second region 602B can result in a change of vibration intensity that is sensed by the user 116. Additionally, moving the drawing instrument 102 from the second region 602B to the third region 602C will result in another change of vibration intensity that is sensed by the user 116.

As noted in this example, the third vibration intensity can be larger than the first vibration intensity and the second vibration intensity. Likewise, the third region can be distinct from the first region and the second region. In this example, the third region 602C represents a border region of the drawing canvas adjacent to the one or more edges 606 of the canvas.

The progression of vibration intensities from the first region 602A to the second region 602B to the third region 602C can indicate to the user 116 a risk reaching the edges 606 of the drawing canvas 132 and consequently drawing off of the drawing canvas 132. As noted above, such an event would be embarrassing for the user 116 At step 508, the method 500 includes generating, by a sensory device, a vibration based on one or more of the first vibration intensity, the second vibration intensity, or the third vibration intensity. For example, the motor 204 of the sensory device 112 can generate the vibration according to the vibration intensity by rotating an unbalanced mass. In general, the controller 208 can cause the battery 214 to transmit different voltage levels to the motor 204 (e.g., by one or more solenoids) to cause the unbalanced mass to rotate at different rotational rates, which in turn, generates different levels of vibration.

In some examples, the controller 208 causes the vibration to change from the first vibration intensity to the second vibration intensity as the drawing instrument 102 is used for drawing on the drawing canvas 132 and as the drawing instrument 102 passes from the first region 602A into the second region 602B. In some examples, the controller 208 causes the vibration to change from the second vibration intensity to the third vibration intensity as the drawing instrument 102 is used for drawing on the drawing canvas 132 and as the drawing instrument 102 passes from the second region 602B into the third region 602C.

While the example represented in FIG. 6 illustrates three regions 602A-602C, more (or less) than three regions can also be implemented with the systems and methods described herein. For example, some systems and methods use two regions (e.g., a "central" region and a "border" region). Some systems and methods use four regions or five regions. Generally, increasing the number of regions provides increased granularity to the position of the drawing instrument 102.

While the above example illustrates a scenario where the regions 602A-602C are defined relative to a threshold distance from the edges 606 of the drawing canvas 132, the regions 602A-602 can also be defined relative the geometric center of the drawing canvas 132. For example, the regions can be defined based on a radius from the geometric center of the drawing canvas 132, and a radial distance of the drawing instrument 102 from the center of the drawing canvas 132 can be determined based on the obtained position information. In turn, the controller 208 can determine the vibration intensity based on the obtained position information in a similar manner as described above (e.g., by comparing the current coordinates of the drawing instrument 102 against the space spanned by the boundaries of the regions). In this way, selecting the one of at least two vibration intensities can be based on a distance of the drawing instrument from the center of the drawing canvas 132 based on the obtained position information.

In some implementations, the method 500 includes illuminating a light attached to the drawing instrument with a constant color and a constant intensity. For example, the controller 208 can transmit a signal to cause the battery 214 to illuminate the light 206 at a constant color (e.g., a white-colored light) and a constant intensity (e.g., full power). In some cases, the controller 208 controls the intensity of the light 206 to be constant irrespective of the obtained position information. For example, the controller 208 can control the light 206 to have a constant intensity irrespective of whether the drawing instrument 102 is within the first region, the second region, etc.

Controlling the light 206 irrespective of the position of the drawing instrument 102 is advantageous because the light 206 can help illuminate the drawing canvas 132 for the user 116 to see. In some cases, the light 206 illuminates at least a portion of the drawing canvas 132 and is also visible to the user 116 using the drawing instrument 102.

As noted above, some users 116 become embarrassed by assistive technology that notifies others about their visual impairment. For example, while the systems and methods described herein can be implemented to cause the light 206 to change colors and/or intensities based on the obtained position information, this can be avoided to prevent bringing attention to the user's 116 potential visual impairment. Avoiding unnecessary attention is one of the reasons why using vibration may be preferable in the systems and methods described herein. Vibration provides a generally non-visual and non-audible feedback to the user 116 without other people noticing.

Figure 7:
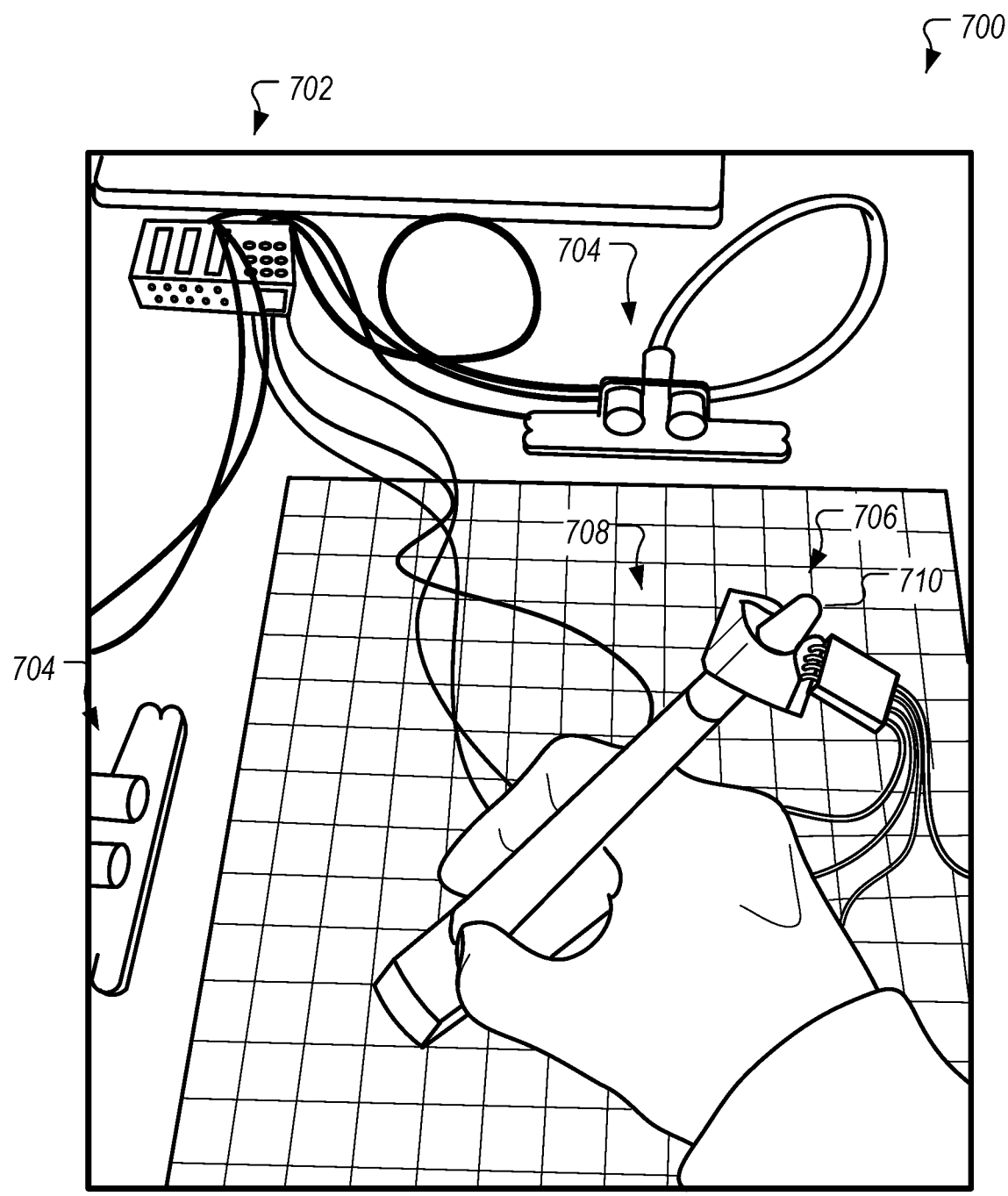
FIG. 7 is an image of a prototype sensory stimuli system.

FIG. 7 is an image of a sensory stimuli system 700. In general, the sensory stimuli system 700 is used during a calibration process to ensure that the sensory stimuli system 700 is working correctly.

A controller 702 can be implemented using an Arduino Uno R3 Plus board. In this example, the controller 702 is external to the drawing instrument 708. The controller 702 is electrically connected to one or more sensors 704 that each include two ultrasonic HC-SR04 sensors and a sensory device 706. In this example, the sensory device 706 is attached to the proximal end of the drawing instrument 708, like the example shown in FIG. 1.

The Arduino controller 702 can be programmed using an Arduino IDE software to define the programming instructions of the sensory stimuli system 700. The programming instructions can include how often position information is obtained from the sensors 704 and the level of precision of the obtained position. In some examples, the level of precision is set to two decimal places. In some examples, the obtained information is received by the controller 702 in sets of five. For example, five data points are obtained sequentially by the sensors 704 and transmitted to the controller 702 together for processing.

The sensory device 706 includes an LED 710 that is powered by 5 Volts. The sensory device 706 includes a 3.3 Volt driver board motor to generate the vibrations. The power source is external to the sensory stimuli system 700 (e.g., via household power), but as noted above with reference to FIG. 1, batteries can also be used.

In some prototype sensory stimuli systems, a single HC-SR04 sensor was positioned along a 1D path that mapped the entirety of the drawing canvas. The paintbrush was put down every two centimeters along the path until five measurements for each point were taken. Using five readings for each point along the canvas allowed the controller to determine an average reading and a percent error between the average reading and the actual position. This process was repeated five times in order to generate both the average percent error along all points for each testing round as well as the overall percent error for the proposed device. In order to account for the 0.78 inch (2 cm) to 157 inch (400 cm) range of the HC-SR04 sensor, the controller accounted for a 0.78 inch (2 cm) offset from the edge of the drawing canvas to ensure that all points along the 1D path could be measured.

Multiple ultrasonic sensors can be used to overcome field of view limitations of the sensors. For example, the HC-SR04 sensors can have a thirty degree field of view. When testing with two sensors, in conjunction with the LED 710 and the motor, a calibration grid was drawn with 0.78 inch (2 cm) squares, where each intersection was tested. The calibration grid is shown in FIG. 7. The average coordinates of each test point and percent difference were calculated in order to find the overall percent error of the sensory stimuli system. In addition to figuring out the percent error, the percentage of the drawing canvas that the sensors could detect were recorded by determining the ratio between the number of points detected and the total number of points tested.

In order to statistically interpret the data, the controller 702 implements a chi-squared analysis. The chi-squared analysis compares all five data sets and provides an indication about the consistency of the obtained position information.

While the sensory stimuli system 700 uses wired connections between the controller 702, the sensors 704, and the sensory device 706, the electrical connection can be wireless as described with reference to FIG. 1 above.

Figure 8:
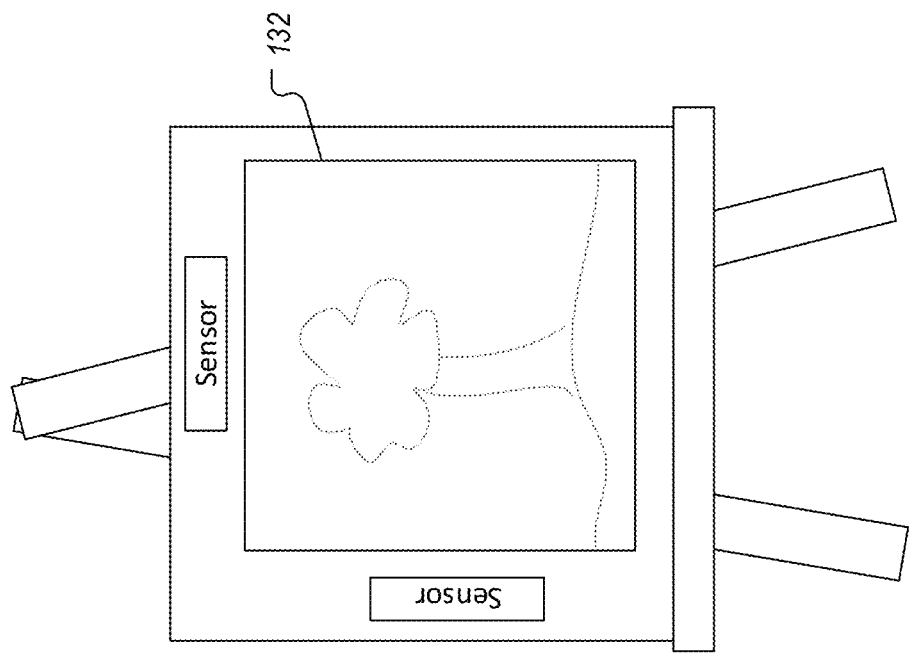
FIG. 8 shows a sensory stimuli system with a drawing instrument and a sensory device in separate hands of a user.
Figure 8:
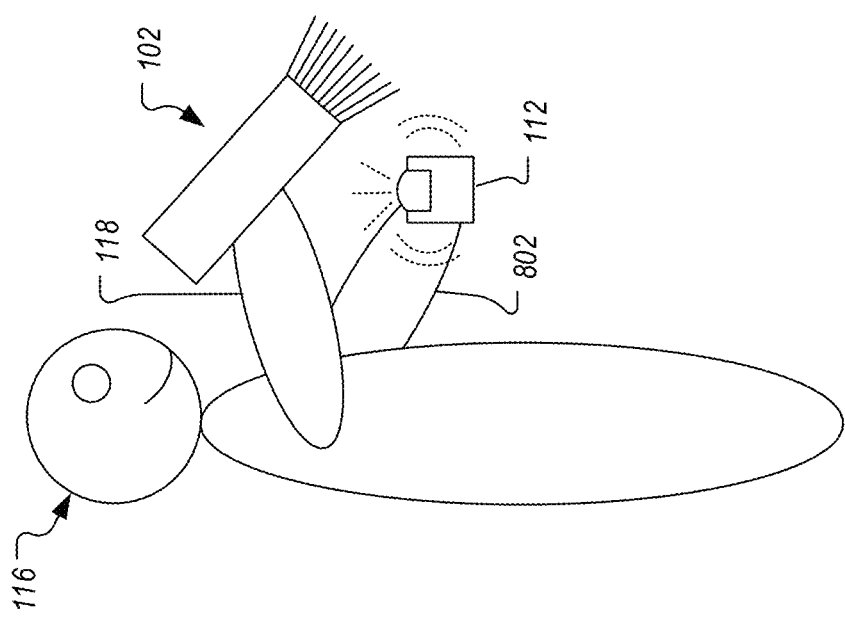

FIG. 8 shows the sensory device 112 detached from the drawing instrument 102. In this example, the sensory device 112 is external to the drawing instrument 102. This configuration allows the user 116 to hold the drawing instrument 102 in a first hand 118 and hold the sensory device 112 in a second hand 802. Because this configuration does not require a connection between the sensory device 112 and the drawing instrument 102, it can be used with any drawing instrument irrespective of whether a physical connection is plausible. For example, a small broken crayon might be difficult to attach to the sensory device 112 but the user 116 can easily hold the sensory device 112 in their other hand. The sensory device 112 works the same way whether the sensory device 112 is attached to the drawing instrument 102 or detached from the drawing instrument 102. For example, the vibration is felt by the user 116 with his or her second hand 802 to indicate to the user 116 whether the drawing instrument 102 is close to one of the edges of the drawing canvas 132.

Figure 9:
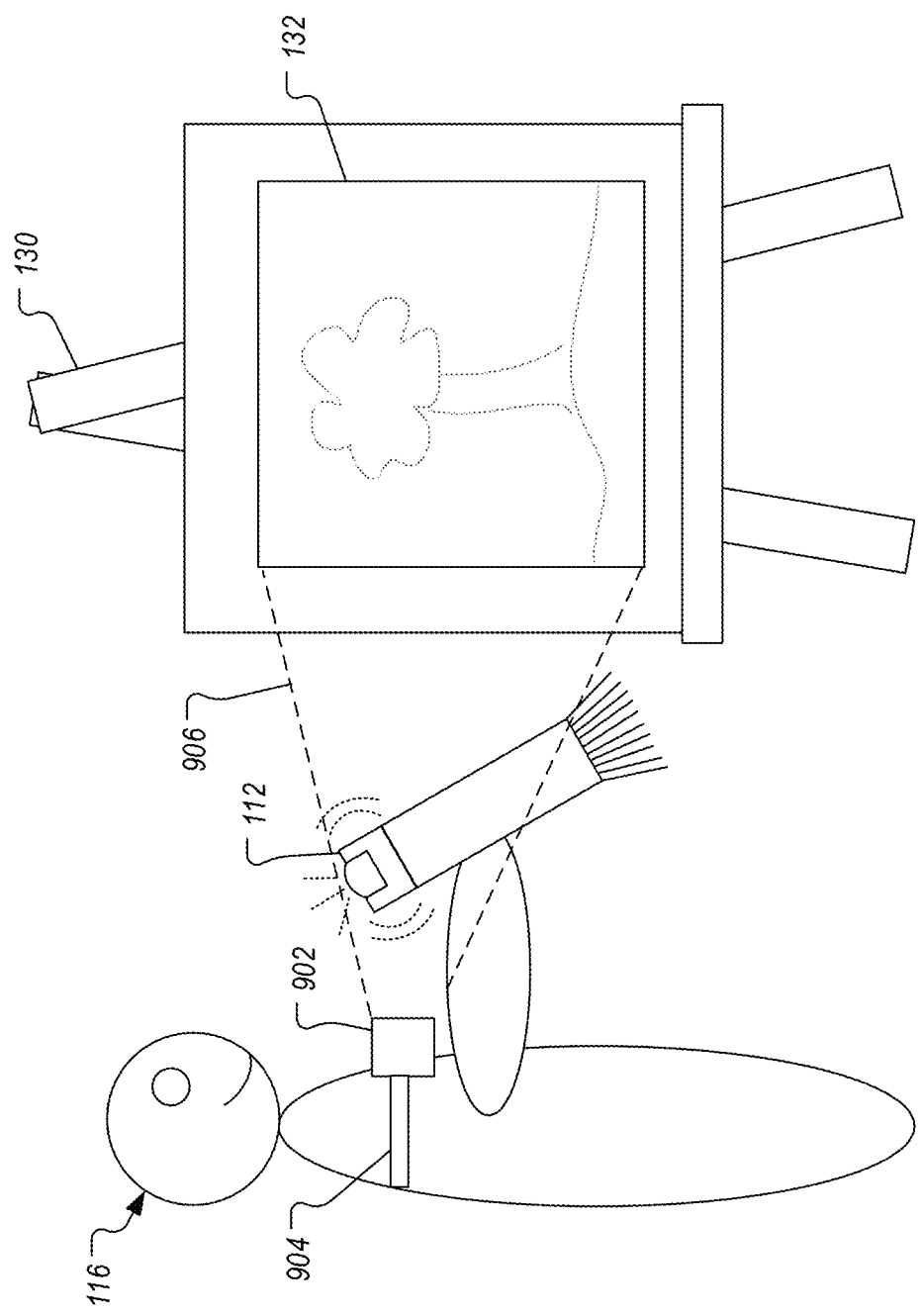
FIG. 9 shows a sensory stimuli system with an imaging sensor mounted to the chest of a user.

FIG. 9 shows one or more imaging sensors mounted to the chest of a user. In this example, the one or more sensors 138 described above with respect to FIG. 1 are replaced with one or more sensors 902 that are attached to a chest of a user (e.g., the user 116). A body mount 904 attaches to the user 116 and holds the one or more sensors 902. The one or more sensors 902 are arranged such that a field of view 906 of each of the one or more sensors 902 is in a direction towards a center of the drawing canvas 132.

In general, locating the one or more sensors 902 on the user 116 can allow for a simpler exchange of easels 130 compared to sensors 138 fixed to the easel 130. Likewise, the one or more sensors 902 can result in sensory stimuli systems that are more portable.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A method comprising:
obtaining, using one or more sensors, position information of a drawing instrument relative to a drawing canvas;
determining, using one or more processors, a first vibration intensity when the drawing instrument is within a first region of the drawing canvas based on the obtained position information;
determining, using the one or more processors, a second vibration intensity when the drawing instrument is within a second region of the drawing canvas based on the obtained position information, wherein the second vibration intensity is larger than the first vibration intensity and the second region is distinct from the first region;
generating, by a sensory device, a vibration based on one or both of the first vibration intensity or the second vibration intensity.

2. The method of claim 1, wherein the sensory device is external to the drawing instrument.

3. The method of claim 1, wherein the first region comprises a central region of the drawing canvas spaced away from one or more edges of the drawing canvas by one or more threshold distances.

4. The method of claim 3, wherein the second region comprises a border region of the drawing canvas adjacent to the one or more edges of the drawing canvas.

5. The method of claim 1, further comprising causing the vibration to change from the first vibration intensity to the second vibration intensity as the drawing instrument is used for drawing on the drawing canvas.

6. The method of claim 1, further comprising drawing on the drawing canvas using the drawing instrument.

7. The method of claim 1, further comprising illuminating a light attached to the drawing instrument with a constant color and a constant intensity.

8. A method comprising:
obtaining, using one or more sensors, position information of a drawing instrument relative to a drawing canvas;
determining, using one or more processors, a vibration intensity based on the obtained position information;
generating a vibration of the drawing instrument using a motor attached to the drawing instrument based on the determined vibration intensity; and
illuminating a light attached to the drawing instrument with a constant color and a constant intensity.

9. The method of claim 8, wherein illuminating the light attached to the drawing instrument with the constant color and the constant intensity comprises illuminating the light with a white-colored light.

10. The method of claim 8, wherein determining the vibration intensity based on the obtained position information comprises selecting one of at least two vibration intensities based on a distance of the drawing instrument from one or more edges of the drawing canvas based on the obtained position information.

11. The method of claim 8, further comprising:
obtaining one or more dimensions of the drawing canvas; and
discretizing the drawing canvas into at least two distinct regions based on the one or more dimensions of the drawing canvas, each region of the at least two distinct regions comprising at least two planes of symmetry,
wherein determining the vibration intensity based on the obtained position information comprises determining the vibration intensity based on which region of the at least two distinct regions the drawing instrument is located in.

12. The method of claim 8, wherein the one or more sensors include at least two ultrasonic imaging sensors.

13. A system comprising:
one or more sensors arranged around a drawing canvas, the one or more sensors configured to obtain position information of a drawing instrument relative to the drawing canvas;
one or more processors configured to determine an intensity of a vibration based on the obtained position information of the drawing instrument relative to the drawing canvas;
a sensory device electrically connected to the one or more sensors and the one or more processors, the sensory device configured to removably attach to the drawing instrument, the sensory device comprising a motor configured to generate the vibration when attached to the drawing instrument based on the determined intensity of the vibration.

14. The system of claim 13, further comprising the drawing instrument, wherein the drawing instrument is a paintbrush, a pencil, a pen, a crayon, or a marker.

15. The system of claim 13, wherein the sensory device is configured to removably attach to a proximal end of the drawing instrument.

16. The system of claim 13, wherein the sensory device comprises a light in electrical communication with the one or more processors, the light being controlled by the one or more processors such that an intensity of the light is constant.

17. The system of claim 16, wherein the intensity of the light is constant irrespective of the obtained position information.

18. The system of claim 16, wherein the light is configured to illuminate at least a portion of the drawing canvas and the light is configured to be visible to a user using the drawing instrument.

19. The system of claim 13, wherein the one or more sensors are mounted on an easel that accommodates the drawing canvas, the one or more sensors being arranged such that a field of view of each of the one or more sensors is in a direction towards a center of the drawing canvas.

20. The system of claim 13, further comprising a body mount attachable to a user, the body mount comprising the one or more sensors, the one or more sensors being arranged such that a field of view of each of the one or more sensors is in a direction towards a center of the drawing canvas.

* * * * *